Aug. 10, 1943.    G. W. THOMPSON    2,326,413
HARMONIC CALCULATOR
Filed Aug. 4, 1940    3 Sheets-Sheet 1

INVENTOR.
George W. Thompson
BY Mann, Brown & Co.
ATTORNEYS

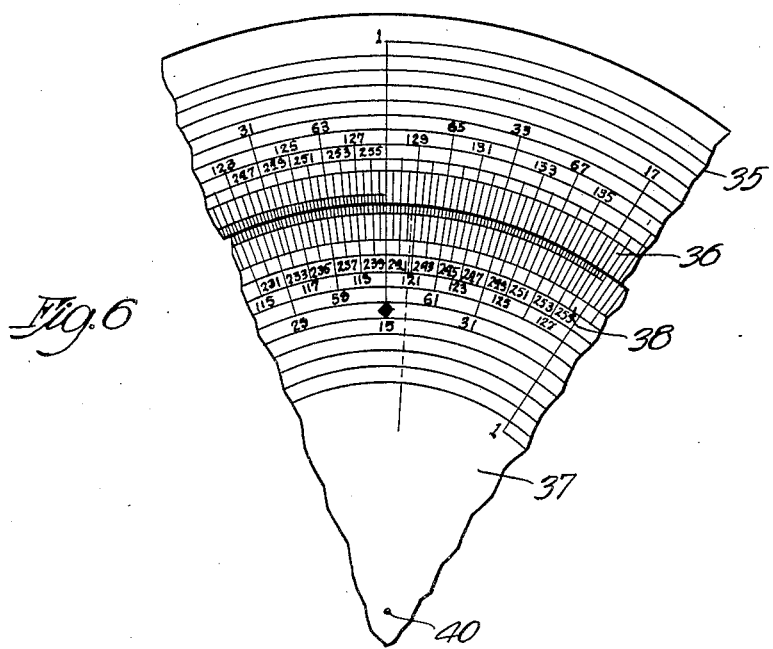

Patented Aug. 10, 1943

2,326,413

UNITED STATES PATENT OFFICE 2,326,413

HARMONIC CALCULATOR

George W. Thompson, Chicago, Ill.

Application August 4, 1940, Serial No. 351,370

4 Claims. (Cl. 84—473)

The present invention relates to the manner and means for analyzing the mixture of undulatory wave motions in their relation to human perception, and while I have more or less lodged the explanation and examples in relations involving sound, the fundamentals disclosed are applicable to other senses also, such as sight and feeling.

I prefer to use sound for purposes of illustrating my invention, since the relation between the wave motion stimulus and pure sensation is quite close. The other senses that might be used for the purpose have associated with them added perceptions of external objects whose effect through learning and illusions, causes variations and errors in the pure perception of the sensation, whereas with sound it is easy to ignore the origin of a sound; i. e., the secondary perception that happens to be present and the sensation can be considered almost entirely introspectively as a pure sensory phenomena.

Considering the hearer to be a normal person, it is well known that sound is the sensation that a person experiences when the ear is subjected to undulatory air motion having a frequency within the range of the ear.

It is also accepted that the ear physically responds to undulatory air motion in a manner similar to a resonation. If the air motion constitutes a simple uniform wave form, the basilar membrane of the ear will resonate, i. e., be vibrated sympathetically, transversely, at a certain point along its length. If the motion is complex as where it constitutes a mixture of two or more wave motions, the basilar membrane will resonate at separate points to the components making up the mixture thereby responding analytically to a complex wave form.

Wherever the basilar membrane resonates, nerve endings are stimulated and the resulting nerve impulses are carried to the auditory center where normally the impulses are perceived collectively as a sound of mixed tones, or with trained musicians can also be perceived as sound composed of the independent wave motions that form the mixture.

Sound, as such, may be noise or music. In understanding the invention it is only necessary to consider, at this time, the musical sounds, namely, the periodic vibrations, and within these only those attributes or characteristics of sound relating to tone, pitch, scales, intervals, consonance, dissonance and harmony.

One of the objects of the present invention is to provide an improved and simplified means for understanding and analyzing the relationship of two simultaneously sounded tones, either as a mathematical problem or from a viewpoint of pure sensation.

Another object is to provide a visual representation of the relationship of the physics of sound to the psychology of hearing and the study of music appreciation.

Another object is to characterize the various ratios and intervals of undulatory motion stimuli and associate them with sensation and perception.

Another object of the invention is to provide an improved representation in measured space of undulatory vibrations as perceived by the human senses, and show the measuring either as a lineal function, or, as an angular function portrayed spirally. Further to provide an improved means and manner for musical appreciation in showing the physical relationships, ratios and intervals of sound waves used in the composition of music.

A further object of the invention is characterized by a simplification of the manner and means for teaching music appreciation and the understanding of music.

These being among the objects of the invention, other and further objects will become apparent from the drawings, the description relating thereto and the appended claims.

Referring now to the drawings:

Fig. 1 is a top view of a slide rule embodying certain features of the invention;

Figs. 2, 3 and 4 are fractional views of the rule shown in Fig. 1 illustrating various uses and relationships described hereinafter;

Figs. 6 and 7 are views of fractional portions of the slide shown in Fig. 5, illustrating various positions and relationships described hereinafter.

Figure 5:
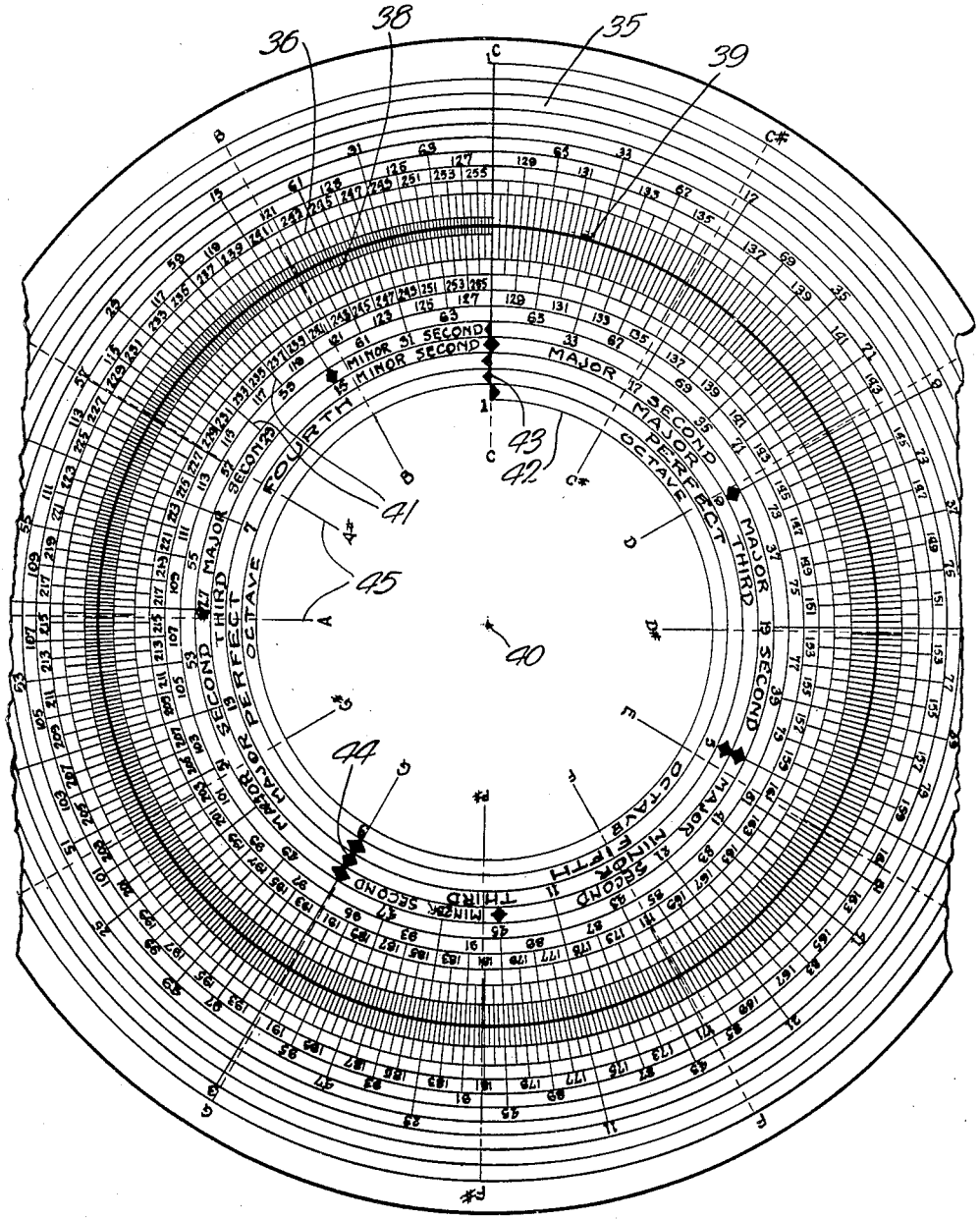
Fig. 5 is a top view of a circular slide rule illustrating another means for accomplishing the objects of the invention.

Broadly speaking, undulatory vibrations mathematically are capable of having and do have doubles of their frequency, and therefore the doubles may be traced in a geometric progression as the frequency multiplied by 2, or followed as an inverse multiple in form of fractions whose denominators are progressively multiples of two.

Interpreted psychologically, within the range of sensation, the double of a frequency is appreciated as substantially the same as the initial frequency. In music, octave notes are treated as substantially the same, varying only in pitch. In trying to perceive the sensations derived from his environment, man interprets these octaves as evenly spaced frequencies, although in fact they are progressively a geometric doubling or halving. In short, man's senses work as though an arithmetic progression were present in the stimulus where actually the stimulus is a geometric progression.

The existence of this perception of unity for octaves may be explained in relation to "beats" which are the sensory interpretation of a secondary vibration developed from the difference in frequency between two simultaneously sounded notes. In octaves, the difference or beats is a frequency identical with the lower of the two notes. Therefore, sensation for octaves begins and ends within the frequencies of the octave notes sounded, and a sense of identity results.

In Fig. 1 a slide rule is shown wherein a sliding member 10 hereafter referred to as the slide, is disposed for longitudinal movement between two parallel stationary bars, an upper one 11 and a lower one 12, that are held together at their ends by plates 13. The slide and bars have a tongue and groove relationship which permits the slide to be removed and inverted and/or turned face for face.

A transparent runner 14 is mounted for movement along the slide and the bars, and in its preferred form, is provided with the usual hair line 16 to assist in making readings, comparisons and the setting of the slide.

The slide 10 has on it vertically spaced lines 17 representing the doubles of or successive cycles of a series of wave motions, in this instance interpreted as octaves of sound. Horizontally spaced lines 18 are provided terminating on the line 17 in relation to frequencies in a particular cycle as derived from experimental data based upon the geometric or logarithmic function of a progression of frequencies.

It is possible to represent the frequencies as equally spaced but the psychological equal intonation of frequencies would then be spaced unequal distances, and in view of the fact that music appreciation is commonly understood from the psychological viewpoint rather than from the geometric progression of frequencies, I prefer to inscribe the frequencies as a logarithmic function and, as shown in broken lines 20, provide the psychological evenly spaced intonations as a geometric progression of evenly spaced lines which represent the semi-tones of the evenly tempered scale.

In the embodiment shown in Fig. 1 the lines 17 reach in length and cover sufficient of the vertical lines 18 and 20 to span or portray two octaves of sound.

The upper bar 11 carries the same scale and semi-tone markings that appear on the slide, but they are arranged symmetrically with respect to the markings on the slide. With this arrangement, any comparison of ratios may be made between different portions of the two scales.

The slide also has inscribed thereon a mathematically derived dissonance curve 19 whose abscissa 21 represents the sounding a second note of a given pitch within the two octaves simultaneously with the note located at the intersection 22 of the co-ordinates. The ordinate 23 represents the degree of comparative roughness or dissonance existing between any two notes thus sounded.

Below the line of the abscissa 21, the natural intervals of the two octaves are shown, as at 31, as representing the seven natural notes or justly tuned intervals of the major mode of each octave.

By way of illustrating the basic harmonies of sound and of the diatonic intervals employed in music appreciation, the intervals of the perfect fifth 23, the perfect fourth 24, major and minor thirds 26 and 27, and major and minor seconds 28 and 29 are inscribed upon the lower bar where they may be used readily in conjunction with the slide, along the lower edge of which as already mentioned are shown the ratios of the intervals 31 between successive notes of the major diatonic scale 32.

Below the intervals of the fifth, fourth, third and second, the true diatonic intervals of the major and minor modes are shown in relation to the natural intervals, and, at the bottom of the individual diatonic scales, a twelve note diatonic chromatic scale 33 is developed which can be played upon the conventional piano keyboard if tuned to diatonic scale. The justly tuned intervals are given which determine the relative pitch of each of the chromatic diatonic intervals in the scale 33.

By this arrangement the intervals of the two scales are made readily available upon the rule for comparison. Furthermore, the relative consonance and dissonance of the harmonic intervals can be readily determined by movement of the slide to locate the intersections of the coordinates at the point of the lowest note sounded in any simultaneous group or progression of notes.

By way of understanding the use of the slide rule described, it would be well to note that the laws governing musical sound are fixed, as well as the relationship of musical sounds and the elements which portray a musical tone. These can be calculated mathematically, and where tuning and music appreciation has been heretofore taught by a method of abstract memory and sensory training, that method can now be supplemented and augmented by the mathematical analyses and comparisons accomplished by the present invention as following the function of the ear.

For example, if it is desired to sound two tones in the relationship of 32 to 33 and the lower of the two is selected to approximate 96 vibrations per second, the "32" upon the slide is moved to line 96 upon the upper bar 11 and it will be noted that the line 33 on the slide coincides with the line 99 upon the bar, in which case the difference between 96 and 99 is three beats per second, as shown directly upon the upper scale.

The ratio of 32 to 33 as representing the relative frequencies of two simultaneously sounded notes is shown by the dissonance curve to have the highest degree of dissonance that is present between any two simultaneously sounded notes. This is true whether the two tones be 32 and 33 vibrations per second representing one "beat" per second or 288 and 297 V. P. S. wherein there are nine "beats" per second.

In considering an example where consonance is present (Fig. 3) the ratio of 5 to 6 may be selected upon the upper bar and the 1 line on the slide located at the line 5 on the bar. Although there are no lines shown upon the slide which then coincide with line 6 upon the upper scale, nevertheless the dissonance curve shows a dip 34 slightly beyond the line that is proximate to line 19 on the slide where the degree of consonance is indicated by the reduction of dissonance to within approximately 18 points of dissonance on the basis of 100 points for maximum dissonance. This interval is the minor third 27, which can be read upon the second line down from the slide upon the lower bar 12.

Or, it will be noticed in this relationship that the relationship of 5-6 upon the slide is the same as 25 to 30 upon the upper bar, thereby indicating by comparison of the slide with the upper bar, what multiples of the relationship 5-6 are available for the intervals of the minor third other than octaves of 5-6.

Another thing indicated by this comparison is that a diatonic minor chord (5-6) is more dissonant in effect than a diatonic major chord (4-5). This may be seen by moving the slide to compare the major and minor third intervals with the dissonance curve.

In this connection the consonant relationship of three notes sounded with interval ratios of 4-5 and 5-6 can be determined. It is known that where the major precedes the minor of the thirds, the relationship to the prime or tonic is in a more natural relationship. This is disclosed by moving the slide to compare the dissonance curve with the major or minor third intervals shown in the second line on the lower bar. The major third and minor third within the span of the perfect fifth for the sonuding of three notes is thoroughly harmonious and constitutes the tonic triad in any justly tuned scale.

From these factors of relative consonance and dissonance are derived the justly tuned intervals in the seven tone scale. In determining the justly tuned intervals, the point of least dissonance and greatest consonance indicated upon the curve of dissonance are shown to fall where the ear perceives equal differences in the interval between successive notes in the octave. In the diatonic scale 32 these are found to be in the ratio and order of 8-9, 9-10, 15-16, 8-9, 9-10, 8-9, and 15-16 beginning at any given pitch or rate of vibration and following the ratios through as repeating cycles.

In the evenly tempered scales, the ratio is according to the frequency span of an octave divided according to the twelfth root of 2 ($\sqrt[12]{2}$) in the octave 1-2. The twelfth root of 2 is employed because the successive differences between the frequencies of the several notes are not equal differences throughout the range of sensation, but are in a ratio which can be written as the twelfth root of 2 or 1.0594631. This ratio constitutes the semi-tone of the evenly tempered scale which corresponds to the half tone on the diatonic scale, although it must be noted that the ratio of 15-16, the diatonic half tone, is greater than the twelfth root of 2.

Considering the relationship of the two scales as providing the intervals by which the ear senses or perceives tones to be equally spaced, the geometrical full steps in the ratio of one to the twelfth root of two and half steps follow in the order of 1-1-½-1-1-1-½ for the evenly tempered scale, and to locate this order of 1-1-½-1-1-1-½ for the major mode of the justly tuned intervals the first note sounded for the scale of the major mode is the "G" note of the evenly tempered scale, it being noted that this order differs slightly or starts at a different place as thus indicated by the relative displacement of "C" for the diatonic from the position of "C" determined for the tempered scale upon the lower bar.

As the frequencies are varied either way from octave intervals, the resultant differential of frequency of the mixed tones is perceived as roughness or dissonance until that differential approaches a frequency having the characteristics of an additional or third tone after which it is equivalent to the sounding of a third tone of that differential frequency in so far as consonance is concerned. Thereafter, with further variations in the differential, dissonance turns to consonance and consonance to dissonance, as shown in the dissonance curve as the secondary note attains a frequency which is consonant or dissonant with either of the prime notes, or both.

In this connection a further use is found for the invention in the composition of music. In event a composer or student desires to use an ascending or descending progression of tempered notes and desires to select according to certain degrees of natural consonance, the slide is manipulated to locate the first or last note selected and the curve of dissonance combined with the showing of the natural harmony of the diatonic intervals will form the basis which will assist in the selection of the intermediate notes as to rate of vibration.

Further, in assisting the composer to understand the ratio of the intervals in the diatonic scale, as though they were provided with a common denominator, the ratios of the fourth octave of the numbers 3-6 may be resorted to. This octave is one of the ratio of 24-48 and the justly tuned intervals will appear in the ratio of 24-27-30-32-36-40-45-48.

With these ratios in front of him the composer determines the basic form which his composition is to take from the basic harmonic of the diatonic major scale and thereafter employs the notes of the evenly tempered scale appearing on the rule, which most closely proximate his selection of the diatonic notes, thereby utilizing the fundamental or natural harmonics indicated by the justly tuned intervals to assist him in attaining the harmonious consonant or dissonant effects he desired to portray when using the tempered major scale.

In brief, the composer determines from the natural harmonics of the true diatonic scale, those notes in the evenly tempered scale which he wishes to use to portray his composition. He obtains the fundamental knowledge of why he uses those notes in the tempered scale from study of the true diatonic scale.

A still further use of the invention relates to transposing (see Fig. 4) where the slide is set for the transposition of three half steps. It is known that the major diatonic scale cannot be transposed from key to key by a player extemporaneously. For this reason the basic diatonic intervals having been tempered to provide the twelve equal divisions of the tempered scale so that transposition may be had. With the present invention the composer seeking to transpose music can do so very quickly by cross reading between the upper bar and the slide, once the slide is set. Not only this, but while transposition is being made the composer can determine the harmonic relationships of the transposed tempered intervals by moving the slide as desired to span the transposed tempered scale with the ratios in the scale having the intervals of 24-28. A comparison can be had immediately. This comparison with basic diatonic intervals assists any transposition. Furthermore, the listing of the various modes of the diatonic scale upon the lower bar assists in determining these and other fundamental harmonies as well as the progressions which form the backbone of the evenly tempered scale.

For example, the mode of the minor sixth is best illustrated by inverting the slide which then shows the inverse order of the diatonic scale which is present in the mode of the minor sixth, also the ratios of the first part of the ascending minor; the first part of the mode of the fourth and the ascending minor modes. In playing the scales marked ascending and descending minor, they are played in conjunction with each other.

In considering intervals greater than the octave and other and further uses of the slide rule that is shown in Fig. 1, other features of my invention become apparent from the description of the embodiment shown in Fig. 5, namely, the circular harmonic slide rule. In this form, it is easier to visualize the relationship of harmonics in the scale and their continuity because the spiral lines indicate the continued progression of the cycles.

Upon examination of the scale in the circular rule, it will be noted that one complete revolution is equal to an octave as it has come to be understood in the terminology of music. The circular slide rule comprises an outer ring 35 carrying one scale 36 and an inner disc 37 having a scale 38 disposed thereon symmetrical to the scale 36 along a line of severance 39. The ring and disc are mounted to pivot relative to each other about the pin 40.

With the circular rule, the theory of harmony teaches, that a tone and its octave are one and the same, is more truly represented. Each octave is represented by one complete turn around the rule and joins as a continuous part with the octave preceding and the octave following.

Speaking in geometric terms, the octave in the circular rule is equal to an angle of 360°. The circle is divided by lines 45 into twelve equal divisions of 30° each which give the twelfth root of two for the intervals of the evenly tempered scale. The other radial lines 41 represent the natural harmonic ratios and each terminates at a point on the spiral line 42 indicating their prime position in relation to each other. These last mentioned lines represent the true relationship of the cycle of frequencies and are spaced in such a manner as to define angles which when compared with each other provide the mathematical proportion and relationships of undulatory wave motions described in connection with Fig. 1.

It will be noticed that no radial line bears an even number. They are all represented by odd numbers where that point appears for the first time in the geometric progression of frequencies, and thereafter the octaves of that frequency are in even numbers. For example, a musical sound may contain the harmonics represented by the numbers 1-2-3-4-5-6-7 and 8. The numbers 2-4 and 8 are even numbers based upon the octave of the odd number 1; the even number 6 represents the octave of 3, and thereafter the upper octaves of 5 and 7 will be 10 and 14, respectively.

On the circular scale, 2 and 4 are represented by the intersections of the "1" line 43 where it intersects the successive turns of the spiral line 42. 6 also is the first intersection 44 of the spiral line above 3, etc.

With the circular rule, it will be observed that all musical tones are in some ratio to one another. Wherever the musical tones are deemed harmonious, they are related to each other in a mathematical relationship known as a harmonic interval. If two tones vibrate in the ratio of 16-32, vibrations per second, they are an octave apart. If a third tone is also sounded, vibrating at a ratio of 17 vibrations per second, it vibrates in a ratio of 17-16 with the first tone and 17-32 with respect to the second tone mentioned. The tone 17 will be closer to the 16 tone than it will be to the 32 tone. In fact, the ratio of 16-17 is slightly less than a semi-tone represented by the diatonic half step interval ratio 15-16. See Fig. 6 where 15-16 on the disc 37 is set opposite 16-17 on the ring 35.

Furthermore, these comparisons will assist in determining the relative value of acceptable tone differences as musical intervals; also, as to whether or not such an interval would constitute a consonant or dissonant sound. For instance, if we are given the vibrations of 901 and 955 to determine whether or not it is an interval which is acceptable for use in musical composition, the disc 37 center scale 38 is turned until the line 15 thereon coincides with the line 901 on the ring 35 (Fig. 7) and it is noted that the given interval is less than an acceptable diatonic semi-tone by the difference between 955 and 961, whereas it is probably acceptable as a semi-tone of the evenly tempered scale when one of the twelve lines is turned either to 901 or 955, the difference appearing to be so slight that it probably would not be detected even upon a well tuned piano.

On the other hand, it is possible to deduce these relationships with the circular rule in terms of degrees, minutes and seconds of angularity, presuming the octave is represented by 360°. The second harmonic thereof is represented by the number 3 and is about 571° from number 1. The third harmonic is the second octave of 1 and is represented by the second intersection of the number 1 line with the spiral lines, or 720° from 1. The fourth harmonic is represented by the radial line marked 5 and this line is about 836.3° from 1. Taking these in consecutive order, zero, 360°, 671°, 720°, 836.3° represent the first five harmonics of a musical sound in degrees. "0" stands for 1 from which all the angles are measured. Subtract 367 from 571 and we get 211° which represents the interval of the perfect fifth. Subtract 720 from 836.3 and the difference 116.3° represents the interval of the absolute or justly tuned major third, the tempered third being 120°. Subtract 116.3 from 120 and the degrees of difference between the justly tuned major third and the interval of the tempered major third can be determined.

If it is desired to divide the interval 14-15 into its fractional parts, these two lines are followed far enough to get the number of intervening fractions desired. If 14-15 is to be divided into four parts, the radial lines indicating 14-15 are followed out to the second octave above, namely 56-60. There the points 56-57-58-59 and 60 determine the mathematical quarters of the ratio 14-15.

Examining the tempered scale a perfect fifth plus a perfect fourth equals an octave. The same holds true of the diatonic scale which is composed of justly tuned perfect fifths and fourths so that when a perfect fourth is added to a perfect fifth a justly tuned octave results. The justly tuned perfect fifth is in the ratio of 2-3 and a justly tuned perfect fourth is in the ratio of 3-4. Therefore if the angle designated by the ratio lines 2-3 is added to the angle designated by the lines 3 and 4, the result is 360°. The angles, and the effect of their addition and subtraction can also be found for the perfect fourth, the major or minor thirds and the major or minor seconds. Because of this, when subdividing an octave, the particular frequencies of the several notes are not equal differences between frequencies throughout the range of sensation, but are a ratio.

Having thus described the invention, various modifications and their uses, it will be apparent to those skilled in the art that various other and further constructions, modifications and uses can be employed without departing from the spirit of the invention, the scope of which is commensurate with the appended claims.

What is claimed is:

1. In a slide rule for calculating the harmonic relationship of sound waves, a plurality of members movable relative to one another along a rectilineal line, one of said movable members having a scale thereon calibrated to represent the progression of a series of wave lengths of sound within a musical octave, a second member having a curve plotted on a base line parallel to said rectilineal line and calibrated to indicate the relative consonance and dissonance of two simultaneously sounded tones having different wave lengths within said octave, said members having a group of calibrations indicating the evenly tempered scale of musical notes in said octave, and one of said members having a group of calibrations indicating the diatonic scale of musical notes in said octave, said calibrations being arranged in identical unit lengths in relation to said octaves whereby transpositions involving ratios between different wave lengths and the relative consonance and dissonance of any two notes sounded simultaneously can be determined by progressive and selective manipulation of said members with respect to one another.

2. In a slide rule for calibrating the harmonic relationship of sound waves, a plurality of members movable relative to one another along a rectilineal line, one of said movable members having a scale thereon calibrated to represent the progression of a series of wave lengths of sound within a musical octave, a second member having a curve plotted on a base line parallel to said rectilineal line and calibrated to indicate the relative consonance and dissonance of two simultaneously sounded tones having different wave lengths within said octave, said member have a group of calibrations indicating the evenly tempered scale of musical notes in said octave, said scales and curve being of identical unit lengths whereby transpositions involving ratios of different wave lengths and the relative consonance and dissonance of any two tones sounded simultaneously can be determined by progressive and selective manipulation with respect to one another.

3. In a slide rule for calibrating the harmonic relationship of sound waves, a plurality of members movable relative to one another along a line of separation, one of said movable members having a scale thereon calibrated to represent a series of wave lengths of sound measured in octaves, a second member having a curve plotted on a base line parallel to said line of separation and calibrated to indicate the relative consonance and dissonance of two simultaneously sounded notes having different wave lengths within said progression, said members having a group of calibrations indicating the evenly tempered scale of notes in said progression including a series of notes above and below a note "C" of the evenly tempered scale, said scale, curve, and group of calibrations being based upon identical unit lengths whereby transpositions involving ratios between different wave lengths and the relative consonance and dissonance of any two tones sounded simultaneously can be determined by progressive and selective manipulation with respect to one another.

4. In a slide rule for calibrating the harmonic relationship of sound waves, a plurality of members movable relative to one another along a line of separation, one of said movable members having a scale thereon calibrated to represent a series of wave lengths of sound within a musical octave, a second member having a curve plotted on a base line and calibrated to indicate the relative consonance and dissonance of two simultaneously sounded tones having different wave lengths within said octave, said members having a group of calibrations indicating the evenly tempered scale of musical notes in said octave, said scale, curve, and group of calibrations being based upon identical unit lengths whereby transpositions involving ratios between different wave lengths and the relative consonance and dissonance of any two tones sounded simultaneously can be determined by progressive and selective manipulations of said members with respect to one another.

GEORGE W. THOMPSON.